(12) United States Patent
Jermyn

(10) Patent No.: US 6,503,115 B1
(45) Date of Patent: Jan. 7, 2003

(54) FLEXIBLE BUOY ASSEMBLY

(75) Inventor: Richard A. Jermyn, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/954,309

(22) Filed: Sep. 10, 2001

(51) Int. Cl.⁷ .......................... B63B 22/00; F16L 1/028
(52) U.S. Cl. ........................................ 441/133; 405/171
(58) Field of Search .............................. 43/44.9, 44.91, 43/44.92; 114/219, 253, 254; 116/210; 441/6, 23, 133, 134; 4/497, 505; 405/168.1, 171

(56) References Cited

U.S. PATENT DOCUMENTS

| | | | | |
|---|---|---|---|---|
| 2,903,990 A | * | 9/1959 | Brown ........................ | 114/219 |
| 3,470,845 A | * | 10/1969 | Mignano ...................... | 441/23 |
| 3,757,370 A | * | 9/1973 | Seno et al. .................. | 441/133 |
| 3,772,718 A | * | 11/1973 | Williams ..................... | 441/133 |
| 3,863,591 A | * | 2/1975 | Wild .......................... | 114/219 |
| 3,964,422 A | * | 6/1976 | Boyd .......................... | 114/219 |
| 3,967,407 A | * | 7/1976 | Halbasch ..................... | 43/44.9 |
| 4,028,759 A | * | 6/1977 | Toups ......................... | 441/29 |
| 4,280,237 A | * | 7/1981 | Petrie ........................ | 441/1 |
| 4,875,427 A | * | 10/1989 | Harris, Jr. ................... | 114/219 |
| 5,016,554 A | * | 5/1991 | Harris et al. ................. | 114/219 |

FOREIGN PATENT DOCUMENTS

GB          15723     *  9/1887  ................. 441/133

* cited by examiner

Primary Examiner—S. Joseph Morano
Assistant Examiner—Andrew Wright
(74) Attorney, Agent, or Firm—Harvey A. Gilbert; Donald G. Peck

(57) ABSTRACT

A flexible buoy assembly includes a flexible buoy having a passage formed therethrough. A flexible line passes through the passage and exits each end thereof. First and second bumpers are fixedly coupled to the flexible line about the circumference thereof. The first bumper is spaced apart from the first end of the passage and the second bumper is spaced apart from the second end of the passage.

14 Claims, 1 Drawing Sheet

FLEXIBLE BUOY ASSEMBLY

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to buoys, and more particularly to a flexible buoy assembly that can flex as it is passed over rollers or other solid objects.

BACKGROUND OF THE INVENTION

Buoys are used for a variety of flotation applications. For example, buoys can be incorporated into towed cable assemblies that must be passed over rollers or other solid objects when they are deployed or retrieved. Accordingly, buoys in these applications are generally made of a flexible material with a cable being attached thereto on at least one end of the buoy.

Existing flexible buoys provide for attachment of a cable using one of the following three methods. In accordance with the first method, the cable is attached to an eye that is molded to or integrated with the buoy material so that cable tension essentially must be restrained by the flexible buoy material. This method is thus limited by the tear resistance of the flexible buoy material.

In accordance with the second method, the cable is attached to a rigid restraint that is passed through and coupled to the buoy body. While the rigid restraint is capable of withstanding substantial cable tension loads, the overall assembly is not flexible.

In accordance with the third method, a rigid tube is inserted through the buoy body and is held in place by friction with the surrounding buoy body. A flexible restraint is passed through or attached to the rigid tube. However, while the flexible restraint provides flexibility, the buoy body assembly (i.e., the buoy body with the rigid tube therein) is inflexible.

SUMMARY OF THE INVENTION

Accordingly, it is an object of the present invention to provide a flexible buoy assembly.

Another object of the present invention is to provide a flexible buoy assembly that is designed to experience minimal damage when passed over rollers or other solid objects.

Other objects and advantages of the present invention will become more obvious hereinafter in the specification and drawings.

In accordance with the present invention, a flexible buoy assembly includes a flexible buoy having a passage formed therethrough with first and second ends of the passage being defined. A flexible line passes through the passage and exits each of the first and second ends. First and second bumpers are fixedly coupled to the flexible line about the circumference thereof. The first bumper is spaced apart from the first end of the passage and the second bumper is spaced apart from the second end of the passage.

When the buoy assembly is pulled past a solid or rigid object, an angle is formed between the line exiting either end of the passage and that portion of the line passing through the passage. Once certain angles have been attained on either end of the buoy, the bumpers bear against the outer surface the buoy. Interacting bearing and tangential contact between the bumpers and the buoy provide resistance to tangential and axial tear out of the line from the buoy.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings an wherein.

DETAILED DESCRIPTION OF THE INVENTION

Figure 1:
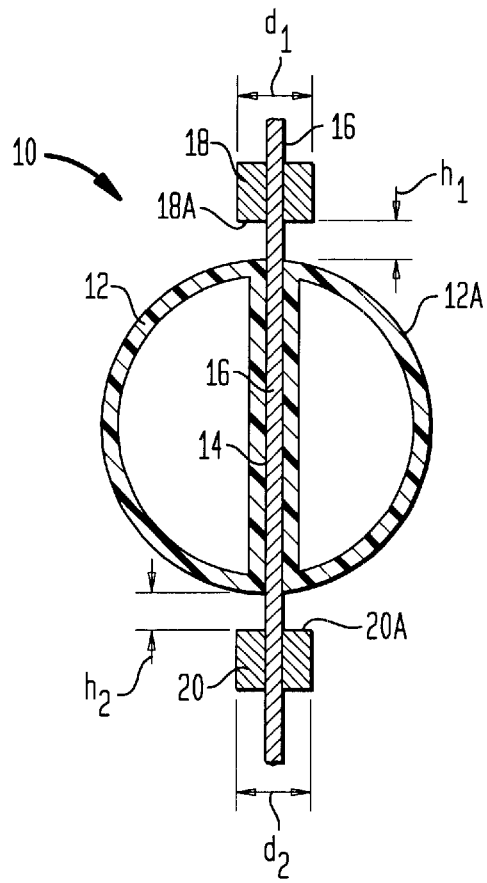
FIG. 1 is a cross-sectional view of an embodiment of a flexible buoy assembly in accordance with the present invention.

Referring now to the drawings, and more particularly to FIG. 1, a flexible buoy assembly according to an embodiment of the present invention is shown and referenced generally by numeral 10. Buoy assembly 10 can be used in a variety of applications to include, in the illustrated example, a flotation device forming part of a towed or otherwise tensioned cable assembly. However, it is to be understood that the inventive features of the present invention could also be incorporated into a stand alone flotation device or a boat bumper in which case a line would only be coupled to one end of the buoy body.

In the illustrated embodiment, buoy assembly 10 includes a flexible buoy body 12 having an internal longitudinal passage 14 formed therethrough. Typically, buoy body 12 is a hollow body made from a flexible plastic material so that its outer surface 12A can flex inward when bumping into a solid object. As is known in the art, such buoy bodies can be inflated or molded to form the ultimate shape thereof. The particular geometrical configuration of buoy body 12 is not a limitation of the present invention.

Passing through and exiting passage 14 from either end thereof is a flexible line (e.g., metal or composite cable, rope, etc.) 16. Line 16 can be loosely fit in passage 14, friction fit in passage 14, or fixedly coupled to buoy body 12 along passage 14 using, for example, an adhesive (not shown).

Coupled to line 16 at either side of buoy body 12 are bumpers 18 and 20 with line 16 then extending beyond bumpers 18 and 20. More specifically, bumper 18 is fixedly coupled (e.g., crimped onto, glued, etc.) to line 16 a distance $h_1$ from one end of passage 14 while bumper 20 is fixedly coupled to line 16 a distance $h_2$ from the opposite end of passage 14. As will become more evident later herein, the distances $h_1$ and $h_2$ can be the same or different depending on the needs of a particular application. Each of bumpers 18 and 20 can be made from a solid (as shown) or hollow semi-rigid to rigid material such as metal, a composite or a plastic.

Bumpers 18 and 20 have respective surfaces 18A and 20A opposing buoy body 12. The geometrical shape of each of surfaces 18A and 20A is typically circular so that the overall shape of bumpers 18 and 20 is generally cylindrical. However, the overall shape of bumpers 18 and 20 is not a limitation of the present invention. As will become more evident later herein, the diameters $d_1$, and $d_2$ of surface areas 18A and 20A, respectively, can be the same or different depending on the particular application.

Figure 2:
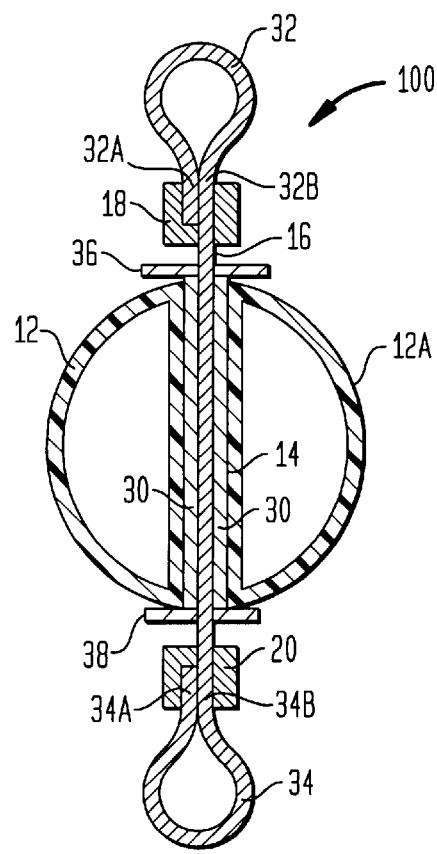
FIG. 2 is a cross-sectional view of another embodiment of a flexible buoy assembly in accordance with the present invention that includes a flexible linear encasing the line passing through the buoy body, the use of bearing plates, and the use of the bumpers to create attachment loops in the line after it exits the buoy body.

Another embodiment of the flexible buoy assembly in accordance with the present invention is illustrated in FIG. 2 and referenced generally by numeral 100. The same reference numerals are used in FIG. 2 to indicate those elements that are common with the FIG. 1 embodiment. In buoy assembly 100, line 16 is encased by, or passed through and fixed to, a flexible liner material 30, the thickness and/or stiffness of which can be used to tailor the flexibility of the combination of line 16/material 30. Liner material 30 can be friction fit or attached to buoy body 12 along passage 14.

Buoy assembly 100 further has line 16 forming one or more loops (e.g., loops 32 and 34 are illustrated) at either side of buoy body 12. For example, line 16 is formed into loop 32 with ends 32A and 32B thereof being retained or captured (e.,g., by crimping, glue, etc.) by bumper 18. A similar construction is used for loop 34. Each of loops 32 an 34 can be coated with a flexible or protective material (not shown) to suit a particular application.

Buoy assembly 100 could also include rigid bearing plates or washers 36 and 38 disposed about line 16 between buoy body 12 and bumpers 18 and 20, respectively. Bearing plates 36 and 38 can be loosely fit onto line 16 and serve as respective bearing surface for bumpers 18 and 20 during the bending or curving of line 16 as will be explained further below. Either or both of bearing plates 36 and 38 can be replaced with a stack of bearing plates (i.e., more than one) without departing from the scope of the present invention.

Figure 3:
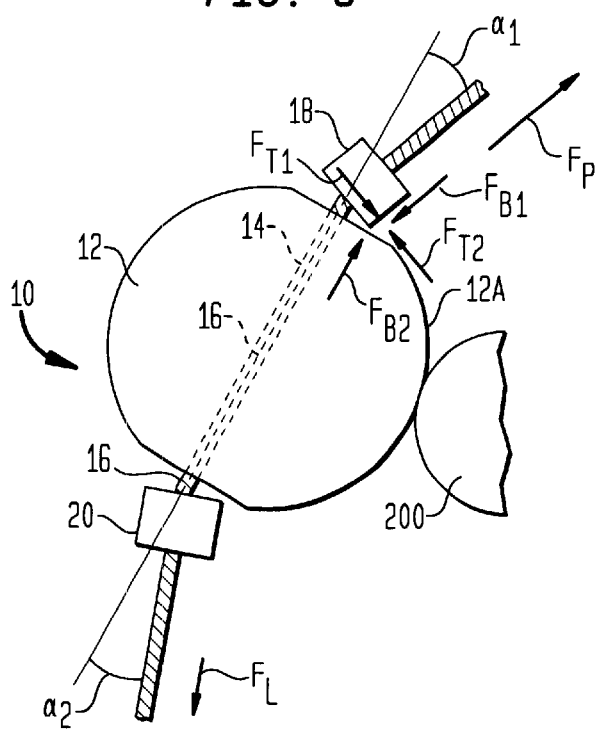
FIG. 3 is a side view of the flexible buoy assembly illustrated in FIG. 1 as it undergoes movement over a solid object.

Operation of the present invention will now be explained for buoy assembly 10 with the aid of FIG. 3 where buoy assembly 10 is pulled past a solid or rigid object 200 which could be an obstruction, the edge of a ship's deck, rollers of a winching system, etc. In FIG. 3, a pulling force $F_P$ is applied to line 16 above bumper 18 while a load force $F_L$ is acting on line 16 below bumper 20. The presence of object 200 causes an angular relationship between forces $F_P$ and $F_L$ so that line 16 above buoy body 12 forms an angle with line 16 passing through passage 14. At a specific angle $\alpha_1$ (which is determined by spacing $h_1$ and diameter $d_1$), bumper 18 begins to bear against outer surface 12A of buoy body 12 and apply a bearing force $F_{B1}$, that is opposed by a force $F_{B2}$ exerted by surface 12A. A tangential force $F_{T1}$ associated with forces $F_{B1}$ and $F_{B2}$ is opposed by a tangential (frictional) force $F_{T2}$ exerted by surface 12A. By providing tangential force $F_{T1}$, the present invention provides resistance to the tangential tearing of line 16 from buoy body 12. Axial tear out of line 16 is prevented by the interaction of bearing forces $F_{B1}$, and $F_{B2}$.

Similarly, line 16 below buoy body 12 forms an angle with line 16 passing through passage 14. At a specific $\alpha_2$ (which is determined by spacing $h_2$ and diameter $d_2$), bumper 20 begins to bear against outer surface 12A so that bearing and tangential forces (similar to those described above) operate to prevent both axial and tangential tear out of line 16 from the lower end of buoy body 12. The spacing $h_2$ and diameter $d_2$ can be selected to suit a particular application. It is to be understood that a similar operational description applies to buoy assembly 100 except that bumpers 18 and 20 would contact respective bearing plates 36 and 38 (once the critical angles $\alpha_1$, and $\alpha_2$, respectively, are attained) thereby distributing the bearing forces to outer surface 12A through bearing plates 36 and 38.

The advantages of the present invention are numerous. The entire buoy assembly is flexible thereby making it especially useful in towed cable applications. The use of an optional flexible liner encasing the line provides a means to tailor line flexibility in the buoy itself, provides additional bearing support along the buoy's internal passage, and prevents abrasion between the line and the buoy's internal passage. The bumpers introduce bearing and tangential forces that act to prevent tangential and axial tear out of the line from the buoy body.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A flexible buoy assembly, comprising:
    a flexible buoy having a passage formed therethrough with first and second ends of said passage being defined;
    a flexible line passing through said passage and exiting each of said first and second ends;
    first and second bumpers fixedly coupled to said flexible line about the circumference thereof, said first bumper defining a first planar surface opposing and spaced apart from said first end of said passage by a first air gap, and said second bumper defining a second planar surface opposing and spaced apart from said second end of said passage by a second air gap; and
    means for preventing axial movement of said flexible line in said passage.

2. A flexible buoy assembly as in claim 1 further comprising a flexible liner encasing said flexible line in said passage.

3. A flexible buoy assembly as in claim 2 wherein said flexible liner is fixed to said flexible buoy along said passage.

4. A flexible buoy assembly as in claim 1 further comprising at least one first rigid plate and at least one second rigid plate disposed about said flexible line, said at least one first rigid plate residing between said first bumper and said first end of said passage, and said at least one second rigid plate residing between said second bumper and said second end of said passage.

5. A flexible buoy assembly as in claim 1 wherein said flexible line is formed to define at least one loop having ends captured by one of said first and second bumpers.

6. A flexible buoy assembly as in claim 5 further comprising a coating encasing said at least one loop.

7. A flexible buoy assembly as in claim 1 wherein each of said first and second bumpers is cylindrical.

8. A flexible buoy assembly, comprising:
    a flexible buoy having a passage formed therethrough with first and second ends of said passage being defined;
    a flexible line passing through said passage and exiting each of said first and second ends to define a first line extension and a second line extension, respectively;
    first and second bumpers fixedly coupled to said flexible line about the circumference thereof, said first bumper defining a first circular and planar bearing surface opposing and spaced apart from said flexible buoy at said first end of said passage by a first air gap, said first circular and planar bearing surface bearing at its perimeter against an outer surface of said flexible buoy when said first line extension forms a first angle with said flexible line passing through said passage, said second bumper defining a second circular and planar bearing surface opposing and spaced apart from said flexible buoy at said second end of said passage by a second air gap, said second circular and planar bearing surface bearing at its perimeter against an outer surface of said flexible buoy when said second line extension forms a second angle with said flexible line passing through said passage; and means for preventing axial movement of said flexible line in said passage.

9. A flexible buoy assembly as in claim 8 further comprising a flexible liner encasing said flexible line in said passage.

10. A flexible buoy assembly as in claim 9 wherein said flexible liner is fixed to said flexible buoy along said passage.

11. A flexible buoy assembly as in claim 8 further comprising at least one first rigid bearing plate and at least one second rigid bearing plate disposed about said flexible line, said at least one first rigid bearing plate residing in and partially filling said first air gap wherein said first circular and planar bearing surface contacts said at least one first rigid bearing plate when said first line extension forms said first angle with said flexible line passing through said passage, and said at least one second rigid bearing plate residing in and partially filling said second air gap wherein said second circular and planar bearing surface contacts said at least one second rigid bearing plate when said second line extension forms said second angle with said flexible line passing through said passage.

12. A flexible buoy assembly as in claim 8 wherein said flexible line is formed to define at least one loop having ends captured by one of said first and second bumpers.

13. A flexible buoy assembly as in claim 12 further comprising a coating encasing said at least one loop.

14. A flexible buoy assembly as in claim 8 wherein each of said first and second bumpers is crimped onto said flexible line.

* * * * *